(12) United States Patent
Sasaki

(10) Patent No.: US 10,108,175 B2
(45) Date of Patent: Oct. 23, 2018

(54) NUMERICAL CONTROLLER SUPPORTING LEFT-HANDED COORDINATE SYSTEM

(71) Applicant: FANUC Corporation, Minamitsuru-gun, Yamanashi (JP)

(72) Inventor: Takafumi Sasaki, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 420 days.

(21) Appl. No.: 14/790,321

(22) Filed: Jul. 2, 2015

(65) Prior Publication Data
US 2016/0026169 A1 Jan. 28, 2016

(30) Foreign Application Priority Data
Jul. 22, 2014 (JP) .................... 2014-148841

(51) Int. Cl.
G05B 19/402 (2006.01)
G05B 19/408 (2006.01)

(52) U.S. Cl.
CPC ....... *G05B 19/402* (2013.01); *G05B 19/4086* (2013.01); *G05B 2219/33258* (2013.01); *G05B 2219/34015* (2013.01)

(58) Field of Classification Search
CPC .................................................. G05B 19/4086
See application file for complete search history.

(56) References Cited

U.S. PATENT DOCUMENTS

| 6,741,242 B1* | 5/2004 | Itoh ................... G06F 17/30896 |
| | | 345/419 |
| 1,484,657 A1 | 5/2005 | Kajiyama |
| 2003/0033105 A1 | 2/2003 | Yutkowitz |
| 2010/0228384 A1 | 9/2010 | Neumaier et al. |
| 2011/0238204 A1 | 9/2011 | Ono et al. |

FOREIGN PATENT DOCUMENTS

| CN | 100498613 C * | 6/2009 |
| DE | 43 26 988 A1 | 2/1995 |
| DE | 10 2009 008 121 A1 | 8/2010 |
| DE | 11 2009 004 583 T5 | 8/2012 |
| EP | 1 484 657 B1 | 9/2008 |
| JP | H03-40109 A | 2/1991 |
| JP | H04-237307 A | 8/1992 |
| JP | H05-181518 A | 7/1993 |

(Continued)

OTHER PUBLICATIONS

Eberly D, Conversion of Left-Handed Coordinates to Right-Handed Coordinates, 2012, Geometric Tools.*

(Continued)

*Primary Examiner* — Mark Connolly
(74) *Attorney, Agent, or Firm* — Drinker Biddle & Reath LLP

(57) ABSTRACT

In a numerical controller that controls a machine tool having a plurality of driving axes, coordinate system conversion processing for a machining program is performed in which the machining program is analyzed and then an instruction based on a right-handed coordinate system and an instruction based on a left-handed coordinate system are interchanged.

10 Claims, 5 Drawing Sheets

(56) References Cited

FOREIGN PATENT DOCUMENTS

JP    2004-525467 A    8/2004
JP    2007-118100 A    5/2007

OTHER PUBLICATIONS

Notification of Reasons for Refusal dated Apr. 4, 2017 in Japanese Patent Application No. 2014-148841 (4 pages) with an English translation (3 pages).
Seiken Yamagishi, "Illustrated Introduction to NC Machine Tools," Tokyo Denki University, the sixth impression of the first edition, 1986, pp. 92-105, in Japanese language.
Office Action dated Oct. 24, 2017 in German Patent Application No. 10 2015 009 210.3 (7 pages) with an English translation (7 pages).

\* cited by examiner

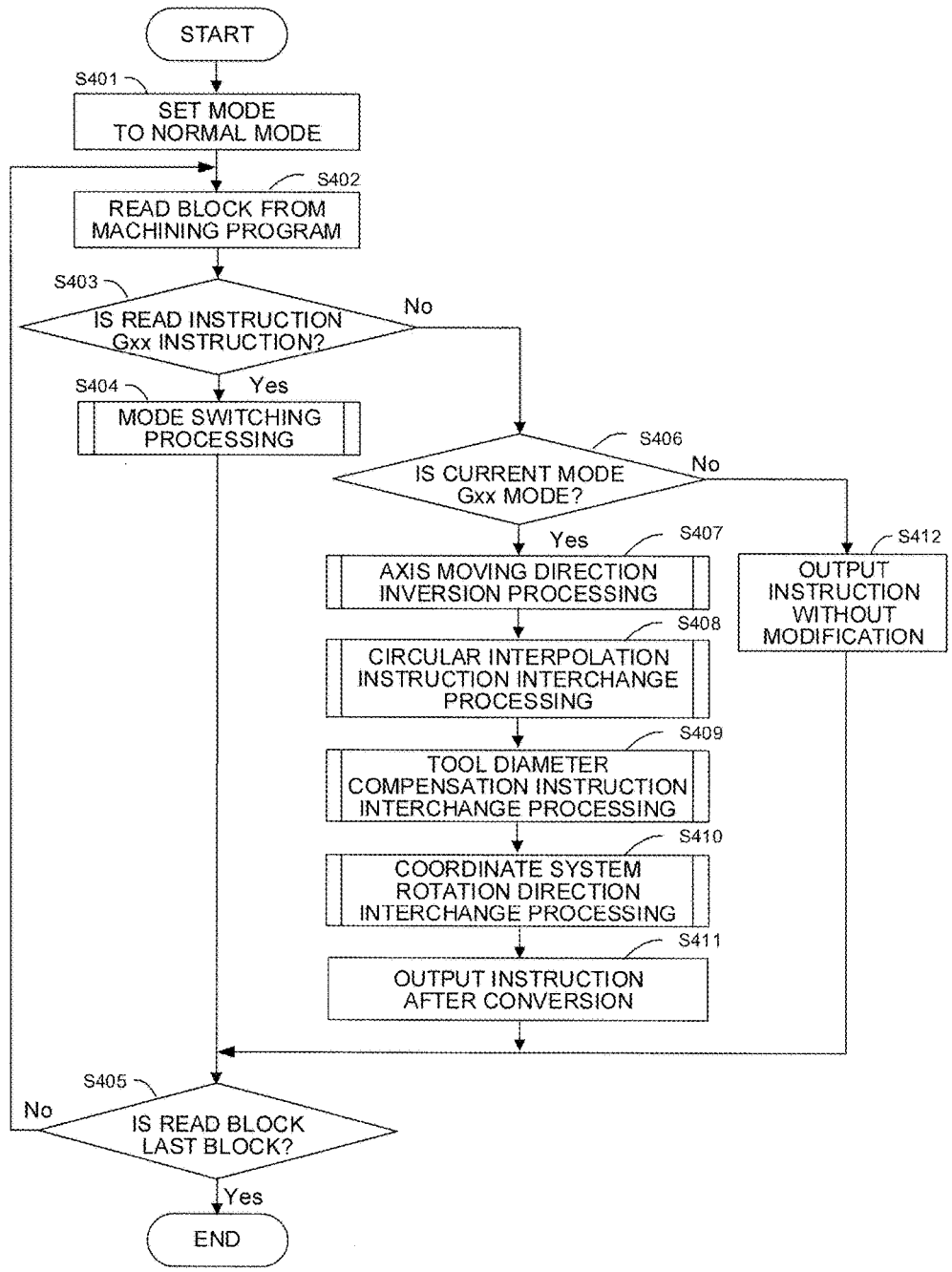

FIG. 5

| | RIGHT-HANDED COORDINATE SYSTEM | LEFT-HANDED COORDINATE SYSTEM |
|---|---|---|
| OPPOSITE IN MOVING DIRECTION OF LINEAR AXIS (FOR ONLY ONE OF X, Y, AND Z AXES) | Y↑, X→, Z⊙ (DIRECTION TOWARD VIEWER FROM DRAWING SHEET IS POSITIVE) | Y↓, X→, Z⊙ (DIRECTION TOWARD VIEWER FROM DRAWING SHEET IS POSITIVE) |
| OPPOSITE IN ROTATION DIRECTION (CLOCKWISE AND COUNTERCLOCKWISE) OF CIRCULAR OR COORDINATE ROTATION | CLOCKWISE CIRCULAR OR COORDINATE SYSTEM ROTATION | COUNTERCLOCKWISE CIRCULAR OR COORDINATE SYSTEM ROTATION |
| OPPOSITE IN DIRECTION (RIGHT AND LEFT) OF TOOL DIAMETER COMPENSATION | COMPENSATED TO RIGHT SIDE WITH RESPECT TO TRAVELING DIRECTION / PROGRAM PATH | COMPENSATED TO LEFT SIDE WITH RESPECT TO TRAVELING DIRECTION / PROGRAM PATH |

NUMERICAL CONTROLLER SUPPORTING LEFT-HANDED COORDINATE SYSTEM

RELATED APPLICATION DATA

This application claims priority under 35 U.S.C. § 119 and/or § 365 to Japanese Application No. 2014-148841 filed Jul. 22, 2014, the entire contents is incorporated herein by reference.

BACKGROUND OF THE INVENTION

1. Field of the Invention

The present invention relates to a numerical controller and more particularly to a numerical controller that has a function of switching between a right-handed coordinate system and a left-handed coordinate system in a machining program.

2. Description of the Related Art

In a machine tool, when a position or a moving direction of a tool is specified with a coordinate, either right-handed coordinate system or left-handed coordinate system is used as the coordinate system for the coordinates (see Seiken Yamagishi, "Illustrated Introduction to NC Machine Tools", Tokyo Denki University, the sixth impression of the first edition, pp. 92-105, 1986).

Differences between the right-handed coordinate system and the left-handed coordinate system will be described by using FIG. 5.

The first difference between the right-handed coordinate system and the left-handed coordinate system is as follows. For linear interpolation of a control axis that supports the tool, when control is performed in the right-handed coordinate system to move the tool in the positive direction of an X axis, the tool moves to the right as an XY plane with the X axis as a horizontal axis and a Y axis as a vertical axis is viewed from the positive direction of a Z axis. On the other hand, when control is performed in the left-handed coordinate system to move the tool in the positive direction of the X axis, the tool moves to the left as the XY plane with the X axis as the horizontal axis and the Y axis as the vertical axis is viewed from the positive direction of the Z axis.

The second difference between the right-handed coordinate system and the left-handed coordinate system is as follows. For circular interpolation of the control axis that supports the tool, when clockwise circular interpolation is performed in the right-handed coordinate system, the tool moves clockwise as the XY plane with the X axis as the horizontal axis and the Y axis as the vertical axis is viewed from the positive direction of the Z axis. On the other hand, when clockwise circular interpolation is performed in the left-handed coordinate system, the tool moves counterclockwise as the XY plane with the X axis as the horizontal axis and the Y axis as the vertical axis is viewed from the positive direction of the Z axis. There is also a similar difference between the coordinate systems in rotation direction of coordinate rotation.

The third difference between the right-handed coordinate system and the left-handed coordinate system is as follows. For issue of a tool diameter compensation instruction for the control axis that supports the tool, when the instruction is issued in the right-handed coordinate system such that a compensation is made to the right side with respect to the traveling direction of the control axis, a moving path of the tool is corrected to the right side as the XY plane with the X axis as the horizontal axis and the Y axis as the vertical axis is viewed from the positive direction of the Z axis. On the other hand, when the instruction is issued in the left-handed coordinate system such that a compensation is made to the right side with respect to the traveling direction of the control axis, a moving path of the tool is corrected to the left side as the XY plane with the X axis as the horizontal axis and the Y axis as the vertical axis is viewed from the positive direction of the Z axis.

Some types of machine tools operate the control axis with the right-handed coordinate system, while others operate the control axis with the left-handed coordinate system. However, in numerical controllers, a position, a moving direction, or the like of the control axis is typically specified with the right-handed coordinate system, and there have been no numerical controllers that support the left-handed coordinate system.

Therefore, when a user attempts to control a machine tool in the left-handed coordinate system by using a conventional numerical controller, the user has to create a machining program by taking into consideration the differences between the right-handed coordinate system and the left-handed coordinate system.

For example, assume that a user programs control for performing, on a machine in the left-handed coordinate system, machining which is similar to the machining to be performed for a workpiece by an instruction "G02 X10.0 Y0 R10.0" in a right-handed coordinate system program shown in FIG. 6A. The user has to envision which path the control axis will take when the right-handed coordinate system is converted to the left-handed coordinate system. The user has also to change G02 (clockwise circular interpolation instruction) to G03 (counterclockwise circular interpolation instruction), and manually create an instruction "G03 X-10.0 Y0 R10.0" in which the sign of the X coordinate is inverted from positive to negative, as shown in and FIG. 6B.

Thus, because conventional numerical controllers have been configured on the premise that control functions are defined for the right-handed coordinate system, there is a problem in that the user has to create a program as an inversion of a program in the right-handed coordinate system on the user's own, resulting in a decrease in efficiency of machining program creation.

Furthermore, how programs compatible with machine tools in the left-handed coordinate system should be created is not clearly represented as guidelines, and each user has to individually conduct the study and creation of a machining program and is therefore likely to make programming mistakes, causing a reduction in machining program quality.

SUMMARY OF THE INVENTION

An object of the present invention is to provide a numerical controller by which, when a machine in the left-handed coordinate system is controlled, a program in the right-handed coordinate system is made available without modification.

A numerical controller according to the present invention controls a machine tool having a plurality of driving axes based on a first machining program. The numerical controller includes: a coordinate system conversion unit that outputs a second machining program obtained by applying coordinate system conversion processing to the first machining program; and an instruction analysis unit that outputs instruction data for specifying operation of the driving axes based on the second machining program. The coordinate system conversion processing applied by the coordinate system conversion unit involves interchanging of an instruction based on a right-handed coordinate system and an instruction based on a left-handed coordinate system.

The coordinate system conversion unit may have two operation modes, a first operation mode and a second operation mode, and may be configured to perform the coordinate system conversion processing when in the first operation mode but not to perform the coordinate system conversion processing when in the second operation mode.

In the coordinate system conversion processing, at least one of the following may be performed: processing for inverting a moving direction of one of the plurality of driving axes, processing for inverting a rotation direction specified by a circular interpolation instruction, processing for inverting a tool diameter compensation direction specified by a tool diameter compensation instruction, and processing for inverting a coordinate system rotation direction specified by a coordinate rotation instruction.

According to the present invention, a machining program created in the right-handed coordinate system can be used without modification in controlling a machine tool in the left-handed coordinate system and also a machining program created in the left-handed coordinate system can be used without modification in controlling a machine tool in the right-handed coordinate system. Therefore, a user can create a machining program without lowering a program creation efficiency.

Moreover, the numerical controller automatically makes a conversion between a machining program in the right-handed coordinate system and a machining program in the left-handed coordinate system. Therefore, programming mistakes due to a manual machining program conversion do not occur, and an effect of maintaining machining program quality is achieved.

BRIEF DESCRIPTION OF THE DRAWINGS

The above and other objects and features of the present invention will be apparent from the following description of an embodiment with reference to the appended drawings, in which:

FIG. 4 is a flowchart of coordinate system conversion processing performed by a coordinate system conversion unit in the numerical controller in FIG. 2;

FIG. 5 illustrates differences between the right-handed coordinate system and the left-handed coordinate system.

DETAILED DESCRIPTION OF THE PREFERRED EMBODIMENTS

Figure 1:
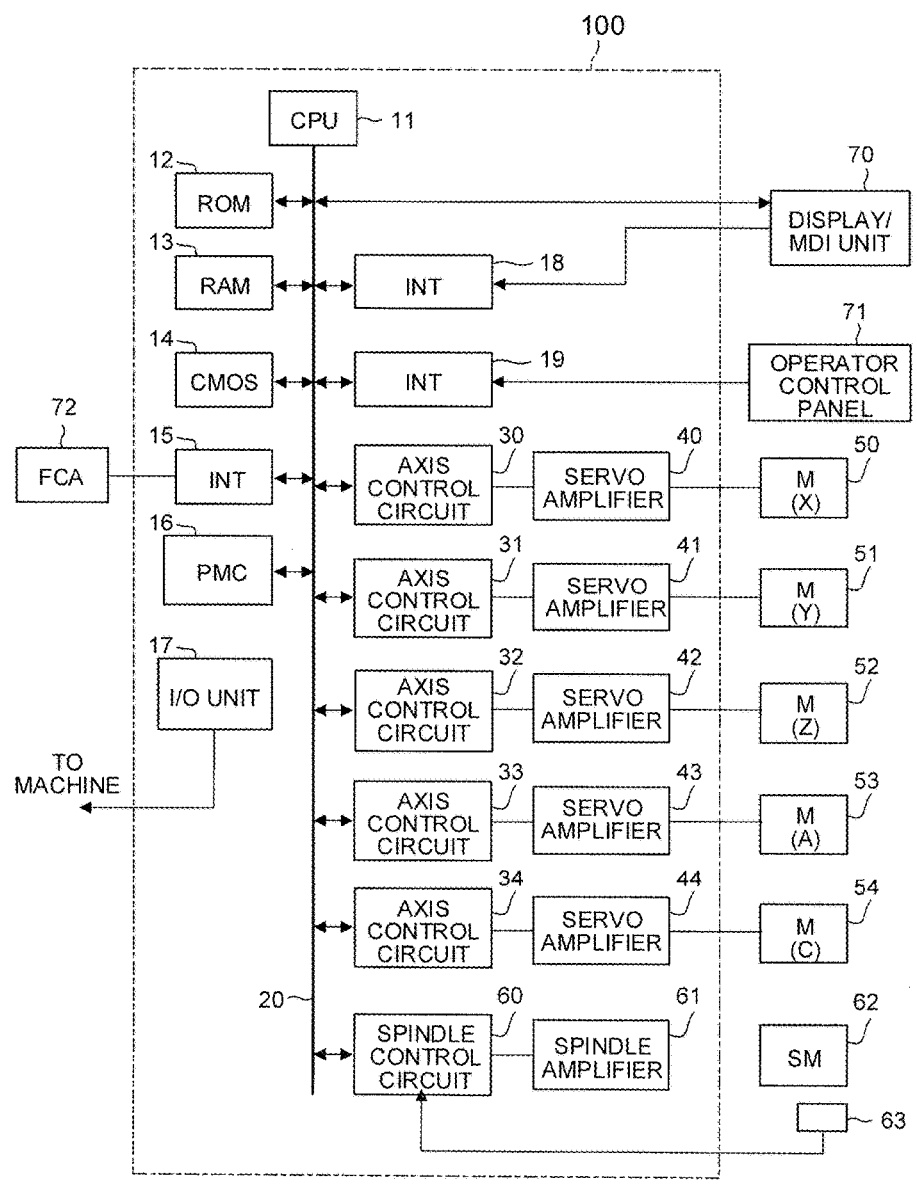
FIG. 1 is a block diagram of essential parts of a numerical controller according to the present invention.

FIG. 1 is a block diagram of essential parts of a numerical controller 100 according to the present invention.

A CPU 11 reads, via a bus 20, a system program stored in a ROM 12, and totally controls the numerical controller 100 by following the read system program. In a RAM 13, for example, temporary calculation data or display data, and various types of data input by an operator via a display/MDI unit 70 are stored.

A CMOS 14 is configured as a non-volatile memory which is backed up by a battery (not shown) and in which a storage state is retained even after the power to the numerical controller 100 is turned off. In the CMOS 14, for example, a machining program (described later) read via an interface 15 and a machining program input via the display/MDI unit 70 are stored. In the ROM 12, various system programs for performing edit-mode processing required for creation and editing of machining programs and processing for automatic operation are written in advance.

Various machining programs such as machining programs for carrying out the present invention can be input via the interface 15 or the display/MDI unit 70 and stored in the CMOS 14.

The interface 15 enables connection between the numerical controller 100 and an external device 72 such as an adapter. From the external device 72, machining programs, various parameters, and the like are read. Machining programs edited in the numerical controller 100 can be stored in an external storage means via the external device 72.

A programmable machine controller (PMC) 16 outputs, via an I/O unit 17, a signal to an auxiliary device (for example, an actuator of a robot hand for exchanging tools) on the machine tool side by a sequence program incorporated in the numerical controller 100, and controls the auxiliary device. Also, the PMC 16 receives signals from various switches etc. of an operator control panel disposed on the machine tool main body, performs necessary processing, and passes the signals to the CPU 11.

The display/MDI unit 70 is a manual data input device that includes a display, a keyboard, etc. An interface 18 receives instructions and data from the keyboard of the display/MDI unit 70 and passes the instructions and data to the CPU 11. An interface 19 is connected to an operator control panel 71 that includes a manual pulse generator etc.

Axis control circuits 30 to 34 for respective axes receive movement commands of each axis from the CPU 11 and output commands for respective axes to servo amplifiers 40 to 44. The servo amplifiers 40 to 44 receive the commands and drive servo motors 50 to 54 for respective axes. The servo motors 50 to 54 for respective axes incorporate respective position/speed detectors, feed position/speed feedback signals from the position/speed detectors back to the axis control circuits 30 to 34 to perform position/speed feedback control. The position/speed feedback is omitted in the block diagram.

A spindle control circuit 60 receives a spindle rotation command for the machine tool and outputs a spindle speed signal to a spindle amplifier 61. The spindle amplifier 61 receives the spindle speed signal, rotates a spindle motor 62 for the machine tool at the specified rotation speed to drive the tool.

A position coder 63 is coupled to the spindle motor 62 with a gear, a belt, or the like. The position coder 63 outputs a feedback pulse in synchronization with spindle rotation. The feedback pulse is fed back to the spindle control circuit 60.

Figure 2:
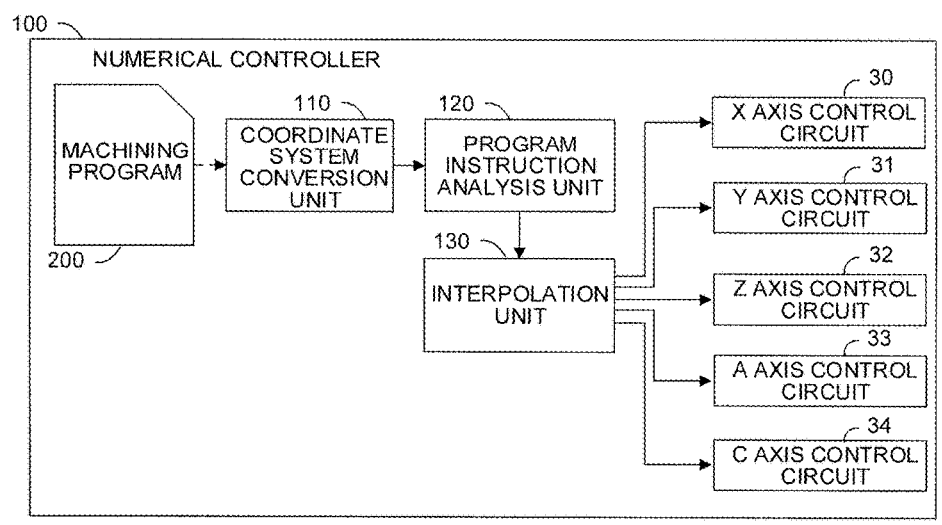
FIG. 2 is a functional block diagram of the numerical controller according to the present invention.

FIG. 2 is a functional block diagram of the numerical controller 100 according to the present invention.

The numerical controller 100 includes a coordinate system conversion unit 110, a program instruction analysis unit 120, and an interpolation unit 130.

The coordinate system conversion unit 110, which is a feature of the present invention, reads a machining program

200 from the CMOS 14 or the like, performs coordinate system conversion processing, and converts an instruction block created in the right-handed coordinate system within the machining program 200 to the left-handed coordinate system. The coordinate system conversion processing will be described later.

The program instruction analysis unit 120 analyzes the machining program output by the coordinate system conversion unit 110 and generates data to be used by the interpolation unit 130. Based on the data output by the program instruction analysis unit 120, the interpolation unit 130 generates interpolation data where points on commanded path are calculated by interpolation with an interpolation periods. Based on the generated interpolation data, the interpolation unit 130 controls respective axes. The program instruction analysis unit 120 and the interpolation unit 130 are similar to the functional means included in a conventional numerical controller.

An overview of coordinate system conversion processing performed by the coordinate system conversion unit 110 in FIG. 2 will now be described.

The coordinate system conversion unit 110 has two operation modes, a normal mode and Gxx mode. In the normal mode, the coordinate system conversion unit 110 sequentially reads each block in the machining program 200 and outputs the read result to the program instruction analysis unit 120 without modification. In the Gxx mode, on the other hand, the coordinate system conversion unit 110 applies a coordinate system conversion to each block in the machining program 200 and passes a result of the conversion to the program instruction analysis unit 120.

In the present embodiment, for introduction of these two modes, an instruction "Gxx" is introduced as a mode switching instruction. When the coordinate system conversion unit 110 is in the normal mode, and if the "Gxx" instruction is read from a machining program, then the coordinate system conversion unit 110 shifts to the Gxx mode. When the coordinate system conversion unit 110 is in the Gxx mode, and if the "Gxx" instruction is read from a machining program, the coordinate system conversion unit 110 returns to the normal mode. In the present embodiment, a description is given with the instruction that toggles between the modes; however, different instructions may be used for a shift from the normal mode to the Gxx mode and a shift from the Gxx mode to the normal mode.

In the Gxx mode, for instruction blocks, the coordinate system conversion unit 110 performs processing for converting a machining program instruction based on four conversion rules below.

(Rule 1) For the specification of X, Y, and Z coordinates specified by a G instruction or the like, a moving direction of any one of the axes is inverted. The setting for the axis, of which moving direction is to be inverted, is made in advance in a setting area such as the CMOS 14 of the numerical controller 100 to match a machine tool to be controlled. The following description is given with an example in which a moving direction of the X axis is inverted.

(Rule 2) Circular interpolation instructions, that is, a "G02 (clockwise circular interpolation)" instruction and a "G03 (counterclockwise circular interpolation)" instruction, are interchanged.

(Rule 3) Tool diameter compensation instructions, that is, a "G41 (tool diameter compensation to left)" instruction and a "G42 (tool diameter compensation to right)" instruction, are interchanged.

(Rule 4) A rotation direction of a coordinate system specified by a "G68" instruction or the like is changed (the sign of a rotation angle is inverted).

Figure 3:
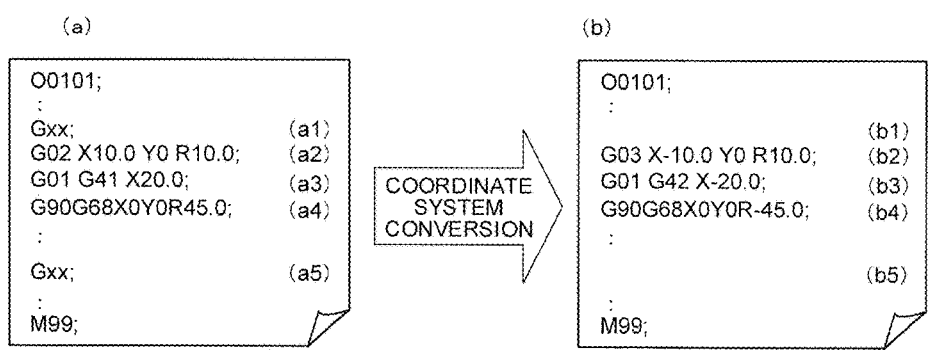
FIG. 3 illustrates a specific example in which a machining program created in a right-handed coordinate system is converted to a left-handed coordinate system by the numerical controller in FIG. 2.
Figure 6A:
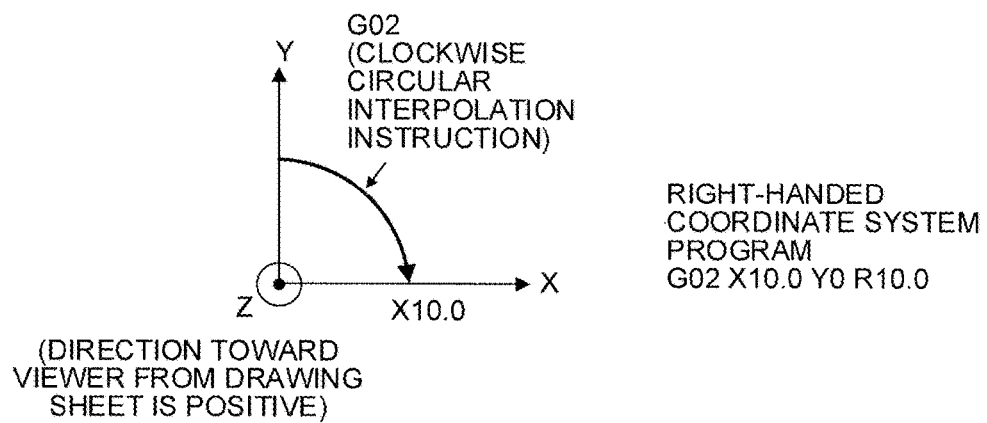
FIGS. 6A and 6B illustrate a relationship between a program in the right-handed coordinate system and a program in the left-handed coordinate system.
Figure 6B:
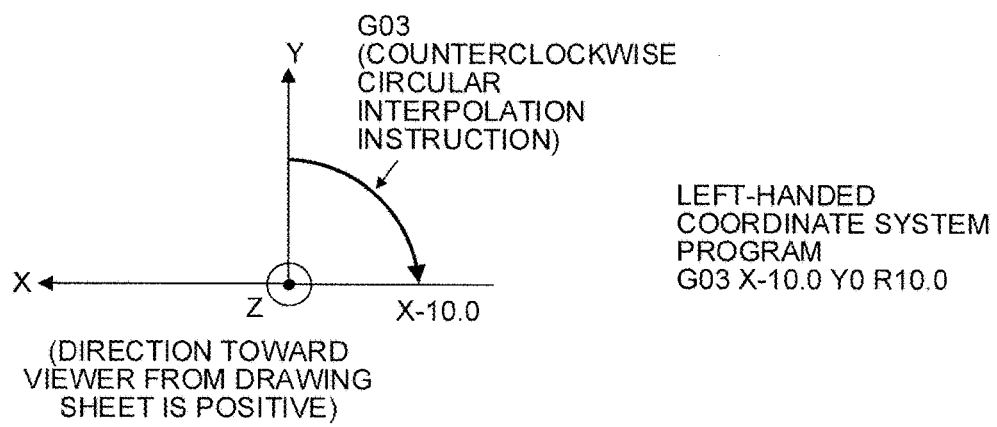

FIG. 3 illustrates a specific example in which a machining program created in the right-handed coordinate system is converted to the left-handed coordinate system.

When control of a machine tool based on the machining program 200 is started, the coordinate system conversion unit 110 first functions in the normal mode, sequentially reads each block contained in the machining program 200, and outputs the read result to the program instruction analysis unit 120 without modification. At this time, the coordinate system conversion unit 110 shifts to the Gxx mode by reading the "Gxx" instruction in (a1), and reads the next block without outputting the "Gxx" instruction to the program instruction analysis unit 120.

Next, the coordinate system conversion unit 110 reads a block "G02 X10.0 Y0 R10.0" in (a2). Rule 1 (X axis moving direction inversion) and rule 2 (circular interpolation instruction interchange) are applied to the read block. The read block is converted to an instruction "G03 X-10.0 Y0 R10.0" as in (b2), and output to the program instruction analysis unit 120.

Next, the coordinate system conversion unit 110 reads a block "G01 G41 X20.0" in (a3). Rule 1 (X axis moving direction inversion) and rule 3 (tool diameter compensation instruction interchange) are applied to the read block. The read block is converted to an instruction "G01 G42 X-20.0" as in (b3), and output to the program instruction analysis unit 120.

Next, the coordinate system conversion unit 110 reads a block "G90 G68 X0 Y0 R45.0" in (a4). Rule 1 (X axis moving direction inversion) and rule 4 (coordinate system rotation direction change) are applied to the read block. The read block is converted to an instruction "G90 G68 X0 Y0 R-45.0" as in (b4), and output to the program instruction analysis unit 120. The specified X coordinate is 0, and remains 0 even after the sign is inverted.

Then, the coordinate system conversion unit 110 performs similar coordinate system conversion processing, returns to the normal mode by reading the "Gxx" instruction again in (a5), and reads the next block without outputting the "Gxx" instruction to the program instruction analysis unit 120.

Then, the coordinate system conversion unit 110 reads the machining program 200 to the end, completes the output to the program instruction analysis unit 120, and then finishes the machine tool control based on the machining program 200.

FIG. 4 is a flowchart of coordinate system conversion processing performed by the coordinate system conversion unit 110 in the numerical controller 100 in FIG. 2. The flowchart will now be described for each step.

[Step S401] First, an operation mode of the coordinate system conversion unit 110 is set to the normal mode.

[Step S402] A block to be processed next is read from the machining program 200.

[Step S403] Whether an instruction in the read block is the Gxx instruction or not is determined. If the instruction is the Gxx instruction (YES), the flow proceeds to step S404. If the instruction is an instruction other than the Gxx instruction (NO), the flow proceeds to step S405.

[Step S404] The operation mode is switched. If the current operation mode of the coordinate system conversion unit 110 is the normal mode, the operation mode is switched to the Gxx mode. If the current operation mode is the Gxx mode, the operation mode is switched to the normal mode.

[Step S405] Whether the read block is the last block or not is determined. If the block is the last block (YES), the coordinate system conversion processing is ended. If there is a subsequent block (NO), the flow returns to step S402.

[Step S406] Whether the current mode is the Gxx mode or not is determined. If the current mode is the Gxx mode (YES), the flow proceeds to step S407. If the current mode is not the Gxx mode but the normal mode (NO), the flow proceeds to step S412.

[Step S407] The details of the read instruction are analyzed. If the instruction is an instruction involving moving of an axis, processing for inverting a moving direction of the axis is performed. In the present embodiment, if the instruction is an instruction involving moving of the X axis, a moving direction of the X axis is inverted.

[Step S408] The details of the read instruction are analyzed. If the instruction is a circular interpolation instruction, processing for interchanging the circular interpolation instruction is performed. In the present embodiment, if the read instruction is a G02 instruction, the instruction is converted to a G03 instruction, and if the read instruction is a G03 instruction, the instruction is converted to a G02 instruction.

[Step S409] The details of the read instruction are analyzed. If the instruction is a tool diameter compensation instruction, processing for interchanging the tool diameter compensation instruction is performed. In the present embodiment, if the read instruction is a G42 instruction, the instruction is converted to a G43 instruction, and if the read instruction is a G43 instruction, the instruction is converted to a G42 instruction.

[Step S410] The details of the read instruction are analyzed. If the instruction is an instruction involving rotation of a coordinate system, processing for interchanging a rotation direction of the coordinate system is performed.

[Step S411] The instruction after the conversion is output.

[Step S412] The read instruction is output without modification.

The invention claimed is:

1. A numerical controller that controls a machine tool having a plurality of driving axes based on a first machining program, the numerical controller comprising:
   non-transitory computer readable memory;
   one or more hardware processors coupled to the non-transitory memory and configured to read instructions from the non-transitory memory to cause the numerical controller to perform operations comprising:
   outputting a second machining program obtained by applying coordinate system conversion processing to the first machining program; and
   outputting instruction data for specifying operation of the driving axes based on the second machining program, wherein
   the coordinate system conversion processing involves interchanging of an instruction based on a right-handed coordinate system and an instruction based on a left-handed coordinate system.

2. The numerical controller according to claim 1, wherein the outputting a second machining program operation has two operation modes, a first operation mode and a second operation mode, and is configured to perform the coordinate system conversion processing when in the first operation mode but not to perform the coordinate system conversion processing when in the second operation mode.

3. The numerical controller according to claim 2, wherein the coordinate system conversion processing includes processing for inverting a moving direction of one of the plurality of driving axes.

4. The numerical controller according to claim 2, wherein the coordinate system conversion processing includes processing for inverting a rotation direction specified by a circular interpolation instruction.

5. The numerical controller according to claim 2, wherein the coordinate system conversion processing includes processing for inverting a tool diameter compensation direction specified by a tool diameter compensation instruction.

6. The numerical controller according to claim 2, wherein the coordinate system conversion processing includes processing for inverting a coordinate system rotation direction specified by a coordinate rotation instruction.

7. The numerical controller according to claim 1, wherein the coordinate system conversion processing includes processing for inverting a moving direction of one of the plurality of driving axes.

8. The numerical controller according to claim 1, wherein the coordinate system conversion processing includes processing for inverting a rotation direction specified by a circular interpolation instruction.

9. The numerical controller according to claim 1, wherein the coordinate system conversion processing includes processing for inverting a tool diameter compensation direction specified by a tool diameter compensation instruction.

10. The numerical controller according to claim 1, wherein the coordinate system conversion processing includes processing for inverting a coordinate system rotation direction specified by a coordinate rotation instruction.

* * * * *